United States Patent [19]
Dison et al.

[11] Patent Number: 5,788,403
[45] Date of Patent: Aug. 4, 1998

[54] FIRE PROTECTION OF STEELWORK

[75] Inventors: Julian Mark Dison; John Michael Dison, both of Warrington, United Kingdom

[73] Assignees: H. Gordon & Co. Limited, United Kingdom; CAFCO Europe SARL, Luxembourg, Luxembourg

[21] Appl. No.: 669,594

[22] Filed: Jun. 24, 1996

[30] Foreign Application Priority Data

Jun. 30, 1995 [GB] United Kingdom ............... 9513376

[51] Int. Cl.$^6$ ................................................. F16B 2/20
[52] U.S. Cl. .................. 403/397; 403/388; 248/228.7; 52/737.4
[58] Field of Search ......................... 403/397, 394, 403/388, 384, 392, 405.1, 407.1; 82/DIG. 8, 731.1, 737.4, 738.1, 736.3; 248/228.7, 228.1; 24/563, 546

[56] References Cited

U.S. PATENT DOCUMENTS

| 662,228 | 11/1900 | Escher | 248/228.7 X |
|---|---|---|---|
| 1,858,836 | 5/1932 | Martell | 248/228.7 X |
| 1,913,527 | 6/1933 | Venzie | 248/228.7 X |
| 2,740,181 | 4/1956 | Cornish | 24/546 |
| 2,921,464 | 1/1960 | Olsen | 24/546 X |
| 3,800,365 | 4/1974 | Bruggert . | |
| 3,908,327 | 9/1975 | Quigg | 52/737.4 |
| 4,043,092 | 8/1977 | Paul et al. . | |
| 4,099,299 | 7/1978 | Bruggert et al. . | |
| 4,201,013 | 5/1980 | Robbins | 24/546 X |

FOREIGN PATENT DOCUMENTS

| 1197540 | 12/1959 | France | 52/DIG. 8 |
|---|---|---|---|
| 926909 | 5/1963 | United Kingdom . | |
| 1174891 | 12/1969 | United Kingdom . | |
| 1186867 | 4/1970 | United Kingdom . | |
| 1387141 | 3/1975 | United Kingdom . | |
| 2071078 | 9/1981 | United Kingdom . | |

OTHER PUBLICATIONS

Fire Resistance Ratings ANSI/UL263 (BXUV), pp.. 1272–1273 Fire Resistance Directory.

Primary Examiner—Harry C. Kim
Attorney, Agent, or Firm—Ware, Fressola, Van der Sluys & Adolphson LLP

[57] ABSTRACT

The fire protection of steelwork requires insulation material to be fitted around any exposed steelwork. Typical steelwork comprises I-section rolled steel members, but the flange thickness can vary considerably in thickness.

The present invention aims to provide a single push-on clip which can be fitted to the most commonly used flange sizes providing a simple but effective means of attaching fire protection material to steelwork.

Accordingly, the clip according to the present invention comprises a length of wire which is bent to form a first abutment disposed immediate the ends of the length of the wire and which is further provided with a pair of second abutments connected to the first abutment by respective connecting limb portions. The first and second abutments are adapted to engage opposite sides of a side flange of the steelwork. Twisting and/or bending of the wire allows the spacing between the first and second abutments to be adjusted to suit a particular flange dimension. Each second abutment is disposed between the first abutment and a respective free end of the length of wire, and wherein the wire beyond the second abutments is returned by one or more bends to provide two free ends which extend in two substantially perpendicular directions. When the clip is fitted to steelwork at least one of the free ends will project from the steelwork and provide a mounting post on which fire protection material can be impaled.

12 Claims, 1 Drawing Sheet

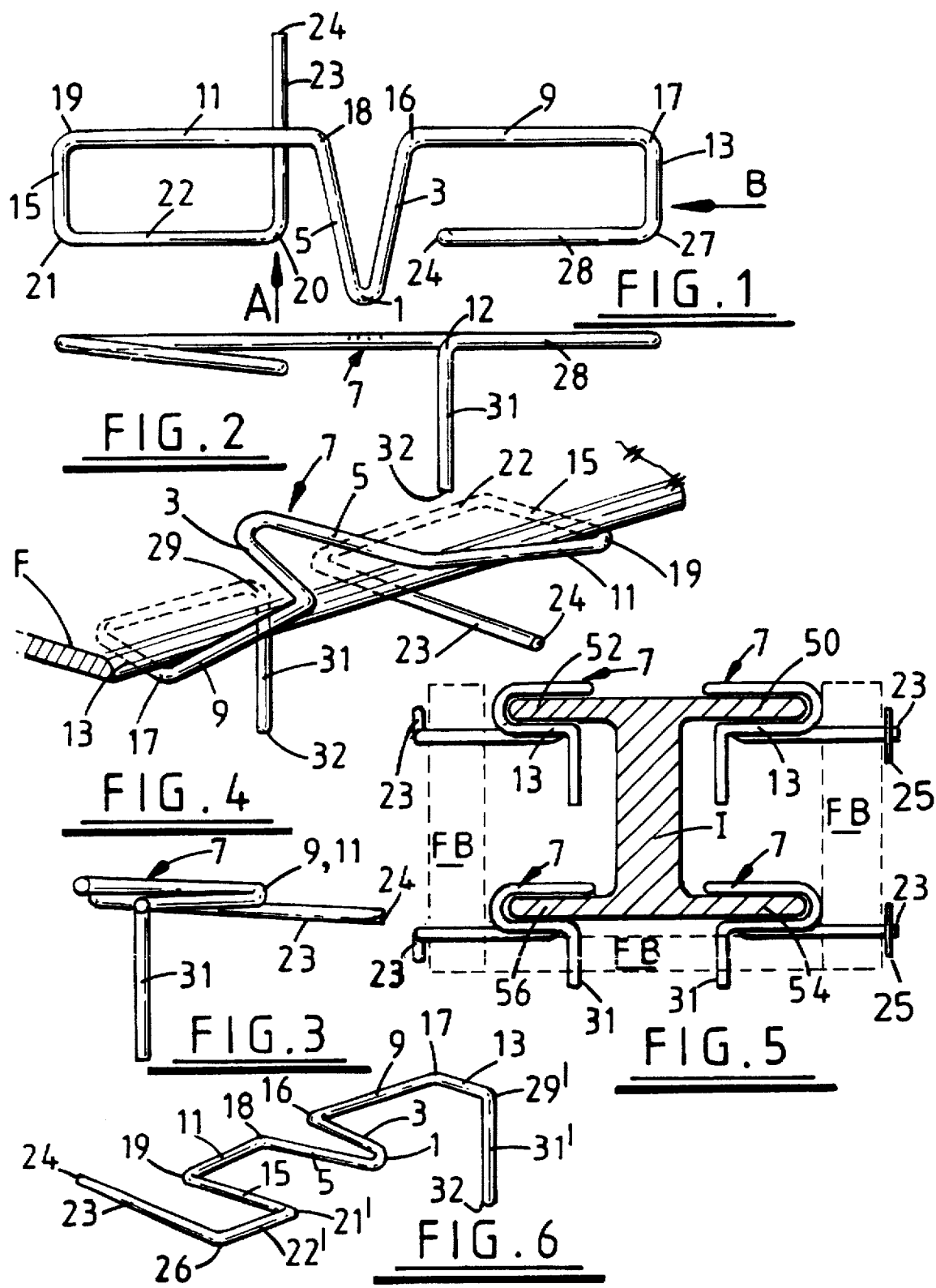

FIRE PROTECTION OF STEELWORK

BACKGROUND OF THE INVENTION

1. Technical Field

The present invention relates to the fire protection of steelwork and in particular to a clip for fixing sheets of mineral fibre insulation board to steelwork.

2. Description of the Prior Art

There is a requirement to fire protect steelwork in buildings using a fire resistant material. Typically, the steelwork to be protected comprises lengths of I-section steel which are typically vertical or horizontal, but not limited to same. The exposed surfaces of the steelwork has to be boxed in and one typical material is a soft mineral fibre board.

Currently this is secured in place by one of two methods. In the first method mild steel pins (say 50 mm long and 2 mm diameter) are welded to the steelwork so as to project normal to the longitudinal axis of the steelwork. Pre-cut pieces of fibre board can then be pushed onto the pins, which pierce their way through the material thereby positioning the sheet of insulation along the sides of the steelwork. A spring retaining washer is applied to the projecting pin to hold the insulation in place. In order to weld the pins in place, any protective paint applied to the steelwork has to be cleaned off and then replaced after welding in of the pins. The procedure is time consuming as the fitter has to work his way along the steelwork cleaning off and welding any pins before the insulation can be fixed in place.

In the second method, fixing pieces of mineral fibre board are cut to fit between the flanges of the I-beam and glued in place. Then sheets of mineral fibre board to box in the steelwork are glued to the fixing pieces and further pieces secured to these to cover the flanges. Clearly this is particularly time consuming.

A push-fit clip system using spring steel clip to secure the insulations in place has been proposed but could only be fitted to a fairly small range of flange thicknesses (making several sizes obligating to suit the application), and furthermore the clip could not be utilized where the beam was used to carry so-called "dovetail roof decking", since the limbs of the clip which would engage the upper surface of the beam was too wide to fit in the available space. This lead to the belief that a practical clip design was not possible and hence the adoption of the above-described fixing methods.

SUMMARY OF THE INVENTION

The present invention aims to provide a solution to the above-mentioned problems.

Accordingly, a first aspect of the present invention provides a clip for use in securing fire protection material to steelwork, the clip comprising a length of wire which is bent to form a first abutment disposed intermediate the ends of the length of wire which, in use, engages one side of a flange of the steelwork, and which is further bent to form at least one second abutment which, in use, engages the other side of said flange, and which is disposed intermediate said first abutment and a free end of said length of wire, and wherein the wire beyond at least one second abutment is returned by one or more bends.

Preferably, a pair of second abutments are formed which, in use, engage the other side of said flange, and which are respectively disposed intermediate said first abutment and a respective free end of said length of wire.

In a preferred embodiment of the present invention, the wire beyond each second abutment is returned by one or more bends to dispose respective end limbs of the clip in substantially perpendicular planes whereby when clipped onto a flange one end limb is disposed in a plane generally parallel to the plane of the flange on which the clip is received and the other end limb is disposed generally perpendicularly thereto.

More particulary, the first abutment comprises two limbs being joined by a common continuous bend, and preferably with an included angle in the range 5°–25°. This allows the first abutment to fit onto the flange within the space available with dovetail floor/roof decking. Alternatively, the two limbs may be formed by two discrete bends. The connection of the respective limbs of the first abutment with respective limbs of the second abutment is by way of two bends in the wire. Preferably, the respective second abutments are disposed laterally outwardly of the first abutment. Conveniently as made, the limbs of the first and second abutment are disposed in the same plane. The angle of the respective bends is approximately 90°. Some variation is possible and may be a desirable option. The limbs of the first abutment and those of the second abutment extend in the same general direction from the respective connecting limbs therebetween. A hard drawn mild steel wire is preferred and the respective bends accommodate subsequent twisting without exceeding the plastic limit of the material. Thus, the number of bends and/or limbs and their length contributes to the range of flange thickness which can be accommodated. With the preferred construction the clip can be used with a flange thickness in the range 5–35 mm, for example.

The opposite outer surfaces of I-section steelwork as defined by the respective flanges are planar and normal to the central longitudinal web of the beam. However, the flanges may be tapered in cross-section and so their inner surfaces may lie in a plane which is inclined to the normal. This inclination is accommodated by twisting along the wire between the first and second abutments and especially at the bends themselves.

The bends in the wire are advantageous in facilitating adjustment of the angle of the limbs on installation since the resultant angle of these prior to adjustment will be determined by the starting angle and the size of the flange to which the clip is fitted. Thus, the fitter can adjust the orientation of the end limbs of the clip to be in the required perpendicular orientation after fitting onto the steelwork. In the case of the clip fitting onto the upper flange, the end limb is advantageously positioned offset downwardly from the plane of the flange and in a parallel plane.

According to another aspect of the present invention, there is provided a method of fitting [fire protecting insulation] a covering material to structural steelwork comprising pushing clips onto flanges of the steelwork at spaced positions along the length thereof so that at least one end limb of the clip projects beyond the widthwise extremity of the steelwork, and thereafter applying a precut sheet of soft mineral fibre board to the projecting end limbs to hold the material in position.

The preferred application of the method is in respect of the fire protection of steelwork in which case the covering material is a fire protecting insulation material. Where the fire protecting insulation material is a soft mineral fibre board, it can be simply pushed onto the projecting end limbs which pierce the material.

It is not essential for the end limbs to project through the insulation but where they do advantageously the method further comprises bending over the projecting end limbs to positively retain the insulation. Alternatively, spring washers may be fitted onto the projecting end limbs and pushed up to the insulation material.

More particularly for a horizontal beam, having flanges disposed uppermost and lowermost, where only the two sides and the underside have to be fire protected, the same clips are employed for both flanges. The clips of the upper and lower flanges are applied in the same orientation, but this means that only one of the end limbs is used in the case of the clip attaching to the uppermost flange, whilst both end limbs are used for the clip attaching to the lowermost flange.

Where the steelwork is to be completely encased, for example in the case of a vertical beam, the clips are applied to the flanges in opposite orientations so that both projecting end limbs are employed. Thus where both end limbs are to project for use the first abutment engages the inwardly facing surfaces of the flange, but where only one end limb is to project it engages the outer planar surface.

BRIEF DESCRIPTION OF THE DRAWINGS

The present invention will now be described further, by way of example only, with reference to the accompanying drawings, in which:

FIG. 1 is a plan view of a clip according to one aspect of the present invention, FIG. 2 is a side view of the clip of FIG. 1 viewed on arrow A, FIG. 3 is an end view of the clip of FIG. 1 viewed on arrow B, FIG. 4 is a perspective view showing the clip of FIG. 1 fitted on a flange of a steel beam, FIG. 5 is a section through a steel beam showing an example of the clip in use, and FIG. 6 is a perspective view of an alternative embodiment of clip according to the present invention.

DETAILED DESCRIPTION OF THE INVENTION

Referring to FIGS. 1, 2 and 3, a clip according to the present invention comprises a length of malleable hard drawn mild steel wire, typically about 450 mm long and 3 mm diameter although other lengths and diameters are feasible. The wire is bent in several places to form the desired shape and comprises a first bend 1 through say 165° to define the two limbs 3, 5 which are divergent with an included angle on the range 5°–25° and preferably of the order of 15°. The two limbs 3, 5 define a first abutment 7. From the ends of the two limbs, the wire is bent through approximately 90° (see bends 16 and 18). This forms respective connecting limbs 9, 11 which connect the first abutment with respective second abutments defined by a respective second limbs 13, 15. Each second limb is formed by bending the wire through approximately 90° at the end of the connecting limbs 9, 11 and in the same direction from the connecting limbs as the limbs 3, 5. Thus bends 16, 17 and 18, 19 are formed. For convenience of manufacture, the limbs 3, 5, 9, 11 and 13, 15 are in a common plane at this stage.

At the end of the limb 15, the wire bends through 90° at 21, extends for a short distance to form an intermediate limb 22 and then bends through a further 90° at 20 to form a limb 23 which leads to one free end 24 of the length of wire. Limbs 22 and 23 are in substantially the same plane and limbs 15 and 23 are substantially parallel to one another. Limb 22 is inclined downwardly with respect to limb 11. Limb 23 extends to project beyond a plane accommodating the limbs 9, 11.

At the end of limb 13, the wire bends through 90° at 27, extends a short distance to form an intermediate limb 28 and then bends through 90° at 29 in a perpendicular direction to extend in a direction away from the first abutment to form end limb 31 which leads to the other free end 32 of the wire.

Thus, free ends 23 and 32 are disposed generally perpendicular to one another.

Malleable hard drawn wire is preferred for the clip material because it allows the adjustment range to be accommodated, but more particularly it allows the limbs 23, 31 to be adjusted by the fixer. Limbs 15 and 22 may be replaced by one straight limb, with a corresponding alteration to the angle of bends, and similarly for limbs 13 and 28.

FIG. 4 shows the above clip received onto the flange F of a steel beam (not further illustrated) and it will be seen how limb 23 projects beyond the edge of the flange in a plane parallel to the plane of the flange and perpendicular to the plane of the web I. This is primarily achieved by twisting along limb 15 after the clip has been pushed home and more specifically at bend 19. Limb 31 extends perpendicularly to the plane of the flange, which orientation may be arrived at by physical bending after installation of the clip, principally at bend 29.

FIG. 5 shows how several clips are applied to an I-section steel beam I in order to apply fibre board insulation FB (shown in dotted outline) to two opposite sides and the underside. Thus, clips are applied to the opposed upper flanges 50, 52 and to the opposed lower flanges 54, 56, in the same relative orientation for each side for the illustrated example whereby the limb 23 comes into play for the clips located on the upper flanges, and the limbs 23 and 31 come into play for the lower flanges. The fibre board insulation is applied to the projecting free ends, and pierces same. As shown in FIG. 5, retention can be further ensured either by bending over the projecting ends of limbs 23, 31 or applying a spring fixing washer 25.

For our preferred embodiment of clip to cover flange thickness of up to 35 mm, we envisage the limbs being dimensioned as follows:

| Limbs 3, 5 | 40 mm |
| Limbs 9, 11 | 60 mm |
| Limbs 13, 15 | 30 mm |
| Limbs 22, 28 | 35 mm |
| Limb 23 | 80 mm |
| Limb 31 | 50 mm |

Referring now to FIG. 6, here a modified clip is employed in which like reference numerals have been used to denote points corresponding to those described above and therefore not described further hereinafter. The differences arise at the end of the respective second abutments 13, 15. Thus, in the case of limb 13, the wire bends downwardly through 90° relative to the plane of limbs 3, 9, 13 at bend 29' to give end limb 31 with free end 32. Thus intermediate limb 28 is omitted. In the case of limb 15, bend 21' is in the opposite direction to bend 21 so that limb 22' is directed away from the first abutment rather than toward it. Limb 22' is bent at 20 as before to provide end limb 23 leading to free end 24. The clip functions in the same manner as that described above. Bends 17 and 19 may be less than 90°, say of the order of 70°–75°. Depending limb 31' may be bent at 29' to extend outwardly so as to lie at an angle to limb 9. Bend 21' may be of the order of 180° and bend 26 of the order of 20° to position limb 23 at 90° to limb 11 and preferably in a common plane as made. In an alternative, limb 23 may further include two substantially right angle bends at spaced locations to position its free end substantially parallel with the second abutment and a first portion thereof but offset from the plane of the flange to which the clip is attached.

Whilst the invention has been described with particular reference to installation of a soft fibre mineral board, the clips may also be used for a rigid insulation board, although for such an application holes will have to be drilled through the boards to receive the projecting ends of the clips. Indeed the clips may have more general application as it can be used wherever a material is to be secured to a flange, especially where the clip is required to provide fixing pins to project either perpendicular and/or parallel to the plane of the flanges.

What we claim is:

1. A clip to secure fire protection material to steelwork, the clip comprising a length of wire, the length of wire having first and second free ends at least one of which, in use, receives fire protection material, a first abutment formed by bending the wire, the first abutment is disposed between the free ends for engaging a first side of a flange of the steelwork, a pair of second abutments formed by further bending of the wire for engaging a second side of the flange of the steelwork opposite said first side, a first connecting limb for connecting the first abutment to one of the second abutments, and a second connecting limb for connecting the first abutment to another of the second abutments, the first abutment being a loop which extends generally perpendicular away from the first and second connecting limbs, one of the second abutments being disposed between said first abutment and said first free end of said length of wire, the other of the second abutments being disposed between said first abutment and, said second free end of said length of wire, and wherein the wire beyond each second abutment has at least one bend, whereby respective end limbs of the clip are disposed in substantially perpendicular planes.

2. A clip according to claim 1, wherein, when disposed on said flange, one end limb is disposed in a plane generally parallel to a plane of the flange on which the clip is received and the other end limb is disposed generally perpendicularly thereto.

3. A clip according to claim 1, wherein the first abutment comprises two limbs joined by a connecting portion of the wire.

4. A clip according to claim 3, wherein connection of the respective limbs of the first abutment with respective limbs of the second abutment is by way of two bends of the wire.

5. A clip according to claim 4, wherein there is a connecting limb portion between each of said two bends and wherein the limbs of first and second abutments extend away from the connecting limbs.

6. A clip according to claim 1, wherein the second abutments are disposed laterally outwardly of the first abutment.

7. A clip according to claim 6, wherein, as made, the limbs of the first and second abutments are disposed in the same plane.

8. A clip according to claim 1, wherein the angle of the at least one bend beyond each second abutment is approximately 90°.

9. A clip according to claim 1 in which one end limb is connected to the second abutment from which it depends by a single bend to position it at substantially 90° to the second abutment from which it depends, and the other end limb is returned outwardly from the second abutment from which it depends so that the second abutment and at least part of said other end limb lie in a substantially common plane.

10. A clip according to claim 9, wherein said other end limb and said second abutment from which it depends lie in a common plane.

11. A clip according to claim 1, wherein the clip is made from a hard drawn mild steel wire.

12. A clip for use in securing fire protection material to steelwork, the clip comprising a length of wire which has first and second free ends, at least one of which, in use, receives fire protection material, and is bent to form a first abutment for engaging a first side of a flange of the steelwork, the first abutment disposed between the free ends of the length of wire, the length of wire is further bent to form a pair of second abutments for engaging a second side of the flange of the steelwork opposite said first side, the second abutments connected to the first abutment by respective connecting limb portions, one of the second abutments being disposed between said first abutment and the first free end of said length of wire, the other of the second abutments being disposed between said first abutment and said second free end of said length of wire, and wherein the wire beyond said second abutments is turned by at least one bend to provide two ends which extend in two substantially perpendicular orientations.

* * * * *